United States Patent [19]

Yip

[11] Patent Number: 4,591,260
[45] Date of Patent: May 27, 1986

[54] IMAGING SYSTEM UTILIZING AN ELECTRO-OPTIC DEVICE

[75] Inventor: Kwok-leung Yip, Webster, N.Y.

[73] Assignee: Xerox Corporation, Stamford, Conn.

[21] Appl. No.: 647,285

[22] Filed: Sep. 4, 1984

[51] Int. Cl.$^4$ ............................................. G03G 15/00
[52] U.S. Cl. ................................. 355/3 R; 355/3 DD
[58] Field of Search ............ 355/3 R, 3 DD; 346/108, 346/160; 358/300, 302; 350/356

[56] References Cited

U.S. PATENT DOCUMENTS

| | | | |
|---|---|---|---|
| 3,656,838 | 4/1972 | Bryant et al. | 350/162 SF |
| 3,744,878 | 7/1973 | Kiemle et al. | 350/160 LC |
| 3,750,136 | 7/1973 | Roess | 340/324 R |
| 4,124,287 | 11/1978 | Bean et al. | 355/3 R |
| 4,251,806 | 2/1981 | McNaney | 340/373.3 |
| 4,281,904 | 8/1981 | Sprague et al. | 350/356 |
| 4,396,246 | 8/1983 | Holman | 350/96.14 |
| 4,517,579 | 5/1985 | Kitamura | 346/108 X |

FOREIGN PATENT DOCUMENTS 2128355 4/1984 United Kingdom ............... 355/3 R

*Primary Examiner*—Arthur T. Grimley
*Assistant Examiner*—J. Pendegrass
*Attorney, Agent, or Firm*—Frederick E. McMullen

[57] ABSTRACT

A xerographic system employing uncharged polarizable toner for developing the latent electrostatic images created on the system photoreceptor, with image exposure means having a laser, optical means for converting the laser beam into a sheet-like line of light for exposing the photoreceptor a line at a time, a total internal reflection type modulator means having an array of independently actuated electrodes in the path of the beam effectively to divide the beam into a line of image pixels in accordance with an image signal input; and for solid image areas, plural adjoining electrodes being actuated concurrently to provide simultaneously side by side beams which destructively interfere with one another and create nulls between adjoining pixels thereby enhancing development of solid image areas by said uncharged toner.

4 Claims, 7 Drawing Figures

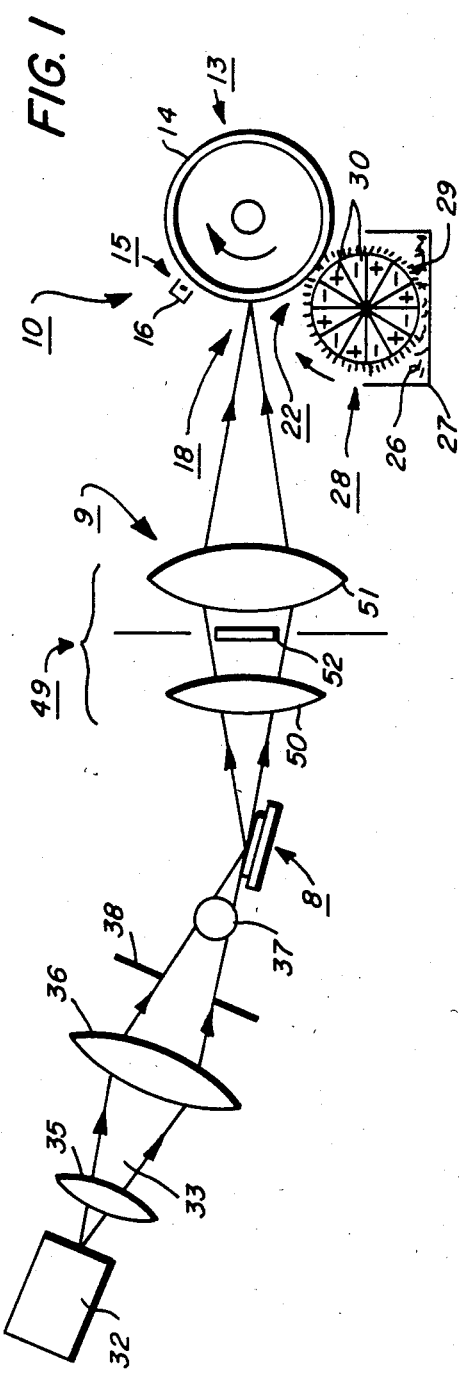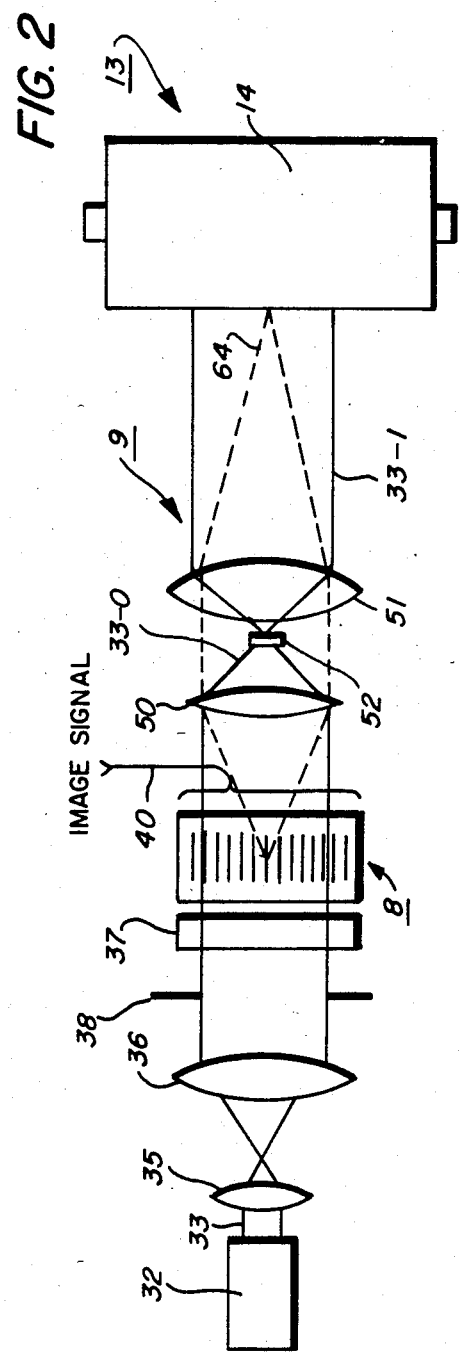

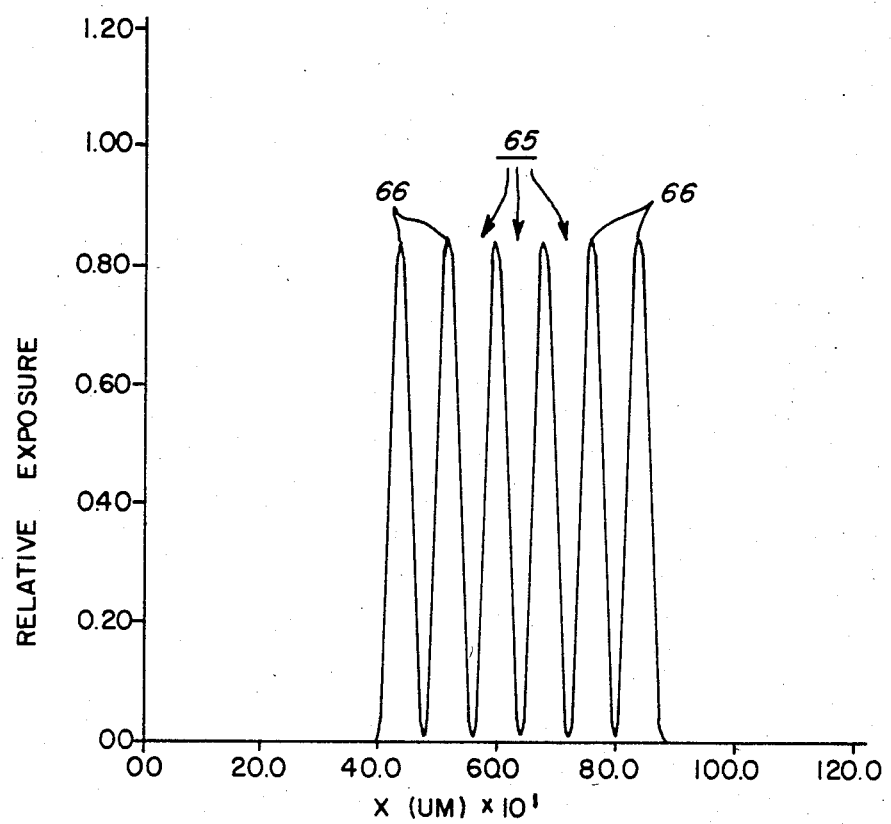

IMAGING SYSTEM UTILIZING AN ELECTRO-OPTIC DEVICE

The invention relates to the formation and development of image charge patterns and more particularly to the formation of non-uniform image charge patterns to enhance image development with finely divided marking material.

In conventional xerography, a photoconductive surface is uniformly charged in the dark with a charge of one polarity. The charged surface is exposed to a pattern of radiation to which it is sensitive, and the charge is dissipated in the radiation-struck areas. An imagewise uniform charge pattern remains in the non-radiation-struck areas.

The imagewise uniform charge pattern is normally developed by contacting the surface with a finely divided, colored toner which carries a charge of the opposite polarity. Because opposite polarities attract, the toner particles adhere to the photoconductive surface in the area of the uniform charge pattern.

The toner particles are most usually charged to the opposite polarity prior to development by rubbing contact with a carrier material. The carrier material is one which is removed from the toner material in the triboelectric series. The carrier material is usually in the form of particles of a larger size than the toner particles. The toner is usually applied to the surface by magnetic brush.

However, the toner-carrier combination typically used is somewhat dependent on the ambient relative humidity for successful operation in that proper triboelectric charging of the toner is difficult if the humidity is too high. Additionally, the carrier can become coated with a thin layer of toner material after long periods of use and this, which is generally referred to as carrier aging, restricts the ability to effectively and properly triboelectrically charge the toner material.

Accordingly, an imaging process which enables the use of a toner material which does not have to be charged to one polarity or another before development is desirable. One toner of the aforementioned type is disclosed in U.S. Pat. No. 4,142,981 to Bean et al. In toners of this type, development is based on the ability of the image charge pattern to polarize the toner particles and the resultant attraction of the polarized toner particles to the image charge pattern.

However, as will be understood by those skilled in the art, the typical latent electrostatic image created on the photoreceptor has areas of relatively high and low positive charges with corresponding negative charges at the photoreceptor interface, such high and low charge areas typically representing solid image areas. These image charge patterns result in the creation of loop-like electric fields at the edges of these charged areas. Unfortunately, any similar electric fields within the borders of these charged areas are of greatly reduced strength and may in the case of charged areas of relatively large size be non-existent. Thus, while the aforementioned electric fields work to polarize adjacent uncharged toner particles and draw the toner particles to the photoreceptor to develop the latent electrostatic image, such development occurs along and in the immediate vicinity of the charged area boundaries and not in the central or midpoint areas thereof. As a result, development of the solid image areas represented by these charged areas may be poor and non-uniform when using uncharged toner.

The invention seeks to overcome the aforementioned problems and enhance the development of solid areas of latent electrostatic images on a movable photoreceptor with uncharged polarizable toner, comprising in combination: a high intensity beam; means for transforming the beam into a relatively wide flat exposure beam for exposing the photoreceptor a line at a time; means for modulating the beam simultaneously across the width thereof in response to an image signal input whereby to provide a discrete line of pixels for exposing the photoreceptor in accordance with the image signals; the modulating means including an optical substrate in the path of the beam, an array of electrodes operatively associated with the substrate, the axis of the electrode array being substantially perpendicular to the axis of the exposure beam, the electrodes being adapted when actuated to diffract the ray of the beam passing through the substrate in the vicinity of the electrodes, the remainder of the beam associated with the unactuated electrodes being undiffracted; a central beam stop; first optical means for impinging the undiffracted beam against the stop; and second optical means for impinging the diffracted beam against the photoreceptor to expose the photoreceptor, solid image areas formed by diffracting a plurality of adjoining rays having reduced exposure at the border between the adjoining rays to provide solid image areas of non-uniform charge enhancing development of the solid image areas by the toner.

The invention further relates to a process for enhancing developing of solid image areas using uncharged toner in a xerographic system having a movable photoreceptor, means to uniformly charge the photoreceptor in preparation for imaging, and means developing the latent electrostatic images created on the photoreceptor with uncharged toner, comprising the steps of: generating a sheet-like beam of high intensity light for exposing the photoreceptor a line at a time; dividing the beam into a series of individually actuatable image rays, the image rays when actuated exposing the photoreceptor; selectively and simultaneously actuating the image rays across the width of the beam in accordance with discrete lines of image signals to expose a line of the photoreceptor at a time; producing solid image areas in accordance with the image signals by actuating predetermined blocks of neighboring image rays; and creating nulls between individual ones of the neighboring image rays in the predetermined blocks to provide a variable charge pattern representative of the solid image areas facilitating developing by the toner.

IN THE DRAWINGS

FIG. 1 is a schematic side view of a xerographic system employing uncharged toner to develop images created on the system photoreceptor, with image exposure means adapted to provide enhanced development by the toner of relatively large solid image areas;

FIG. 2 is a schematic bottom plan view of the xerographic system shown in FIG. 1;

Figure 6:
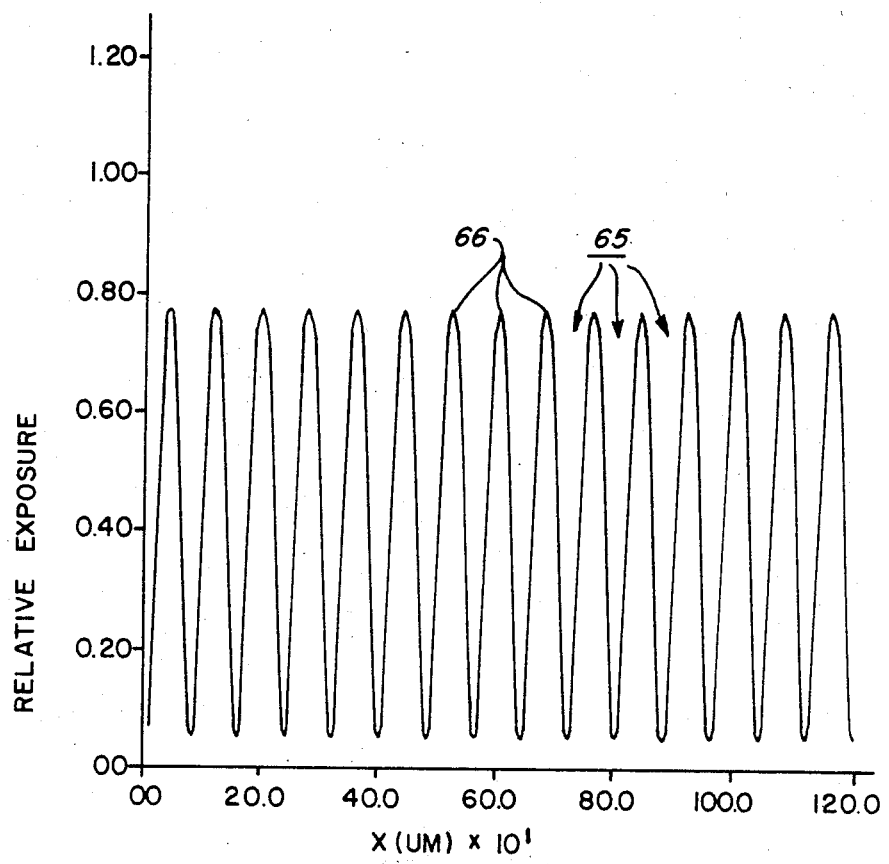

FIG. 6 is a graphical representation showing a portion of an image line in which all pixels are on to demonstrate the null or less exposed area created between successive light rays as with a relatively large solid image area; and FIG. 7 is a graphical representation showing an image line portion in which six successive pixels are on to demonstrate the null or less exposed area created between the six adjoining light rays as with a relatively wide solid image line.

Turning now to the drawings, and at this point especially to FIGS. 1 and 2, there is shown a xerographic system 10 having a photoreceptor 13 in the form of a rotatable photoconductively coated drum 14 moved (by means not shown) in the direction of the solid line arrow in FIG. 1. While a drum type photoreceptor 13 is shown, it will be evident that other photoreceptor types could be used, such as photoconductively coated xerogrpahic belts and plates, and accordingly photoreceptor 13 should be visualized in the generalized case.

Xerographic system 10 includes a charging station 15 where photoreceptor 13 is uniformly charged in preparation for imaging by a suitable charging device such as corotron 16. Photoreceptor 13 thereafter moves through an exposure station 18 where the previously charged photoreceptor is exposed in accordance with the image content of an image signal to create an electrostatic latent image as will appear. Following exposure, photoreceptor 13 passes through a developing station 22 where the latent electrostatic image is developed by toner 26. Following development, the developed image is transferred to a suitable copy substrate material such as a copy sheet at a transfer station (not shown). Photoreceptor 13 is thereafter cleaned at a cleaning station (not shown) preparatory to charging by corotron 16.

Toner 26 comprises a single component uncharged polarizable developer of the type described in U.S. Pat. No. 4,142,981, issued on Mar. 6, 1979, to Lloyd F. Bean et al and incorporated by reference herein, toner 26 being composed of toner particles formed through a predetermined combination of insulating toner particles and conductive toner particles chosen so that the triboelectric relationship between the particle types is very low. Developing station 22 has a supply of toner 26 in reservoir 27, with a magnetic brush 28 for developing the latent electrostatic images on photoreceptor 13. Magnetic brush 28 has an outer sleeve 29 rotatably supported in close operative relation with the photoconductive surface of photoreceptor 13 with a plurality of magnets 30 therewithin, magnets 30 being of alternating positive and negative polarity. Sleeve 29 is rotated in the direction shown by the solid line arrow in FIG. 1 by suitable drive means (not shown).

In the aforedescribed xerographic system, the latent electrostatic image created on photoreceptor 13 is developed with neutral, i.e. uncharged but polarized toner 26 rather than the charged toners typically used in more conventional xerographic systems. The foregoing development process is based on the ability of the image charge pattern on the surface of photoreceptor 13 to polarize the toner particles and the attraction of the polarized toner particles by the field gradient created by the image charge pattern to the photoreceptor. For a narrow line image, a strong electric field gradient between the latent image charge (which is typically positive) on photoreceptor 13 and the charge (which is typically negative) at the photoreceptor interface exists over the image. But for relatively wide image lines or solid image areas, because of the width of the solid area, the electric field gradient between image charge and interface charge is weak and possibly non-existent, and in order to compensate for this and assure uniform and complete development, a microscopically non-uniform image charge pattern, such as a periodic charge distribution, is desired. Thus, in contrast with conventional xerographic systems, a non-uniform charge pattern rather than a uniform charge pattern is desirable with developer such as toner 26 to assure complete development of solid areas and optimum copy quality.

To provide the aforedescribed non-uniform charge pattern in the case of wide line and solid image areas and assure optimum development thereof using single component developer such as toner 26, imagewise exposure of photoreceptor 13 is effected by means of an electro-optic line printing mechanism 9 employing a Total Internal Reflection or TIR type modulator 8. Line printing mechanism 9 has a suitable source of high intensity electromagnetic radiation such as laser 32, the beam 33 output by laser 32 being first expanded by suitable beam expanding lens pair 35, 36 to provide a sheet-like beam of light for exposing a line of photoreceptor 13 at a time. Following lens pair 35, 36, the expanded beam passes through an aperture 38 of predetermined size to a cylindrical lens 37 which focuses the expanded beam 33 onto TIR modulator 8.

Figure 3:
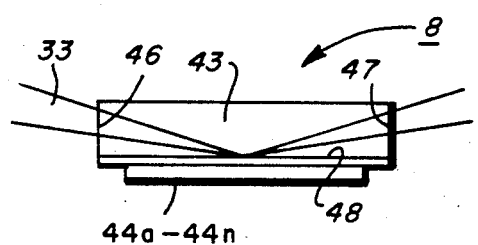
FIG. 3 is an enlarged side view of the modulator for image exposure.
Figure 4:
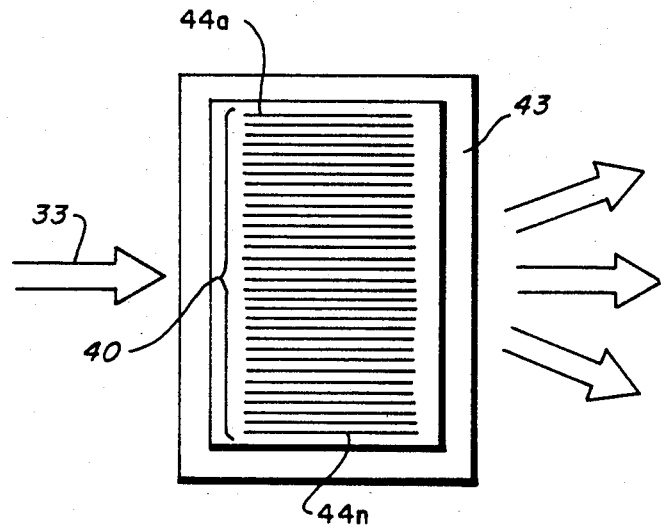
FIG. 4 is an enlarged bottom plan view of the modulator shown in FIG. 3.
Figure 5:
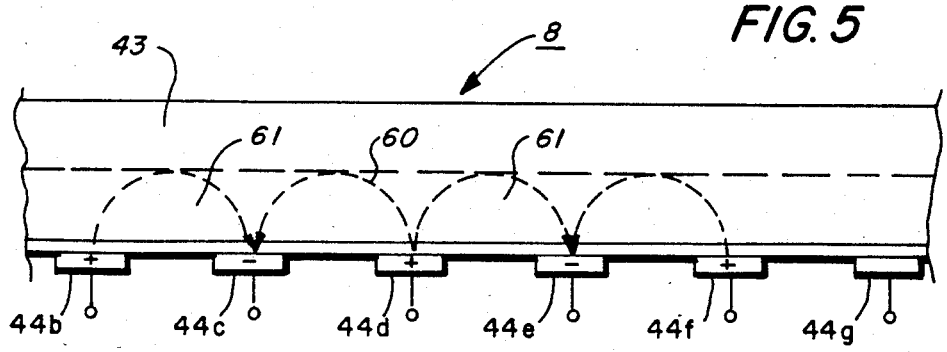
FIG. 5 is a further enlarged and fragmentary schematic end view of the modulator shown in FIG. 3 illustrating the interaction between the fringing fields and the light beam.

Referring particularly to FIGS. 3-5, modulator 8 comprises an electro-optic substrate 43 having an array of individually addressable electrodes 44a-44n distributed across essentially the full width of the substrate 43. Typically, the electrodes 44a-44n are 1-30 microns wide and are on centers which are more or less equidistantly separated to provide a generally uniform interelectrode gap spacing of 1-30 microns. Electrodes 44a-44n extend generally parallel to the optical axis of substrate 43, each electrode 44a, 44b, 44c, ... 44n projecting a substantial length along the substrate optical axis. As will appear, electrodes 44a-44n act as minute light valves disposed in an array across the operating width of beam 33, the electrodes serving in effect to subdivide beam 33 into a succession of individually modulated light rays, each associated with one image pixel.

For the total internal reflection (TIR) mode of operation illustrated, the electro-optic substrate 43 may be a y-cut crystal of $LiNbO_3$ having an optically polished input face 46 at one end, an optically polished output face 47 at the opposite end, and an optically polished intermediate reflecting surface 48. The electrodes 44a-44n are in turn engaged with, or at least closely adjacent to, the reflecting surface 48 of the electro-optic substrate 43 whereby electric fringe fields are coupled into the electro-optic substrate 43 as subsequently described. Modulator 8 modulates the beam 33 in accordance with an image signal input by means of a spatially varying phase pattern generated by applying a voltage pattern to the array of individually addressed electrodes 44a-44n as will appear.

In operation of modulator 8, and referring to FIGS. 2-5, the sheet-like collimated beam of light 33 from laser 32 is transmitted through the input face 46 of the electro-optic substrate 43 at a grazing angle of incidence relative to the reflecting surface 48. The light beam 33 is brought to a wedge shaped focus by lens 36 at approximately the centerline of the surface 48 and is totally reflected therefrom for subsequent transmission through the output face 47 of substrate 43. As described, light beam 33 illuminates substantially the full width of the substrate 43 and as will appear is phase front modulated while passing therethrough in accordance with the image signals or pixels applied to adjacent electrodes 44a–44n.

To modulate the light beam 33, successive sets of digital or analog image signals or pixel bits representing successive lines of the original image, are applied to the individually addressable electrodes 44a–44n. For this purpose, image signals may be derived from any suitable source such as memory, communication channel, raster input scanner, etc. The image signals may be clocked by suitable clock means (not shown) into a suitable line buffer (not shown) a line at a time, the line of image signals in the line storage buffer being thereafter input to modulator 8 during the period between lines, i.e. as photoreceptor 13 is advancing in a cross line direction (as shown by the solid line arrow in FIG. 1) to the next line.

The image signals produce localized fringe fields 60 within an interaction region 61 of the electro-optic substrate 43 defined by each electrode gap so that any time there is a voltage difference between consecutive electrodes, the pixel therebetween is on. Where no voltage difference exists between consecutive electrodes, the pixel is off. As a result, localized variations in the refractive index of the electro-optic substrate 43 widthwise of the interaction region 61 occur, such refractive index variations faithfully representing the image signals appearing on the electrodes 44a–44n at any given point in time. Consequently, the phase front of the light beam 33 is spatially and serially modulated line by line in accordance with the image signals as the light beam 33 passes through the interaction region 61 of the electro-optic substrate 43.

To expose the photoreceptor 13 in an image configuration, Schlieren central dark field imaging optics 49 are provided which are optically aligned between the modulator 8 and photoreceptor 13 to image the modulated light beam onto the photoreceptor. As will be understood, the imaging optics 49 convert the spatial phase front modulation of the light beam 33 into a correspondingly modulated intensity profile and additionally, provide any magnification that is required to obtain an image of a desired width. The illustrated imaging optics 49 include a field lens 50 for focusing the zero order diffraction components 33-0 of the phase front modulated light beam 33 onto a central stop 52 at the fourier transform plane and an imaging lens 51 for imaging the scattered higher order diffraction components or sidebands 33-1 onto photoreceptor 13. The field lens 50 is optically aligned between the modulator 8 and stop 52 so that substantially all of the zero order components 33-0 of the light beam 33 are blocked by stop 52. The higher order diffraction components 33-1 of the light beam 33, referred to herein as upper and lower sidebeams, scatter around the stop 52 and are collected by the imaging lens 51 which, in turn, causes them to fall onto the image plane of modulator 8 defined by photoreceptor 13. Of course, other optical arrangements may be used to convert the phase front of the phase modulated light beam output by modulator 8 into a light beam having a correspondingly modulated intensity profile.

As indicated in FIG. 2 by the broken lines 64, each pair of electrodes 44a–44n cooperates with the electro-optic substrate 43 of modulator 8 and the phase-sensitive readout optics 49 to effectively define a local modulator or light valve for creating a pixel at a unique, spatially predetermined position along each line of the image, the total number of pixels forming a unique image line. As will be understood, the number of electrodes 44a–44n determine the total number of pixels that can comprise an image line. By sequentially applying successive lines of image signals, which are supplied to modulator 8 as a data stream 40, to these local modulators while photoreceptor 13 is advancing in a cross line direction relative to the modulator 8, successive lines of pixels are printed.

Referring now to the graphical representation of FIGS. 6 and 7, when modulator 8 is operated in the central dark ground mode described, high contrast, dark areas or nulls 65 occur between adjacent on-pixels 66 in the image plane, i.e. at photoreceptor 13. These dark areas or nulls 65 are primarily caused by destructive interference between the upper and lower side bands that comprise the imaging beam 33-1 at the beam stop 52 and produce a non-uniform charge pattern on photoreceptor 13 of the type exemplified by FIGS. 6 and 7. An example of the non-uniform charge distribution that results for large solid image areas is shown in FIG. 6 and an example for smaller solid image areas, i.e. a relatively wide line is shown in FIG. 7. As can be seen, use of TIR modulator 8 provides the desired non-uniform charge pattern for solid image areas on photoreceptor 13 with resultant optimum solid area development when using single component developer such as toner 26.

The dark areas 65 shown in FIGS. 6 and 7 have high contrast (about 14:1) and sharp edges 66 between adjacent on-pixels. While such high interpixel contrast is undesirable for conventional two component xerography, it provides an excellent periodic charge pattern on photoreceptor 13 for solid image areas which promotes uniform development by single component developer such as toner 26.

With the assumed geometry and optical magnification described above, the period p of the periodic pattern is approximately 80 $\mu$m, and the half-width w of each on pixel approximately 40 $\mu$m. Assuming a photoreceptor thickness q of 20 $\mu$m and a toner diameter d of 7 $\mu$m, the following relations are envisioned:

$w/p=0.5$
$p/d\approx 11$
$p/q=4$
$q/d\approx 3$

As will be understood, the above noted relations indicate that the largest and most uniform force needed for dipole development is satisfied with resulting high output optical density.

While beam 33 has been illustrated and described as exposing the previously charged photoreceptor 13 in accordance with an image signal input to create latent images, xerographic system 10 may instead or additionally incorporate a light/lens exposure system for copying document originals. There, as will be readily understood by those skilled in the art, the document original to be copied is suitably supported as by a transparent glass platen, and scanned by a movable scanning apparatus having one or more lamps for illuminating a line-like portion of the document and suitable optical means for conducting the image light rays from the document to an exposure point or station on photoreceptor 13 downstream of the exposure station 18. When the aforementioned light/lens exposure system is used, the array of electrodes 44a . . . 44n of modulator 8 are actuated simultaneously by a suitable uniform signal input to provide a line of diffracted beam components 33-1 on the image plane defined by photoreceptor 13. As described, dark areas or nulls 65 occur between the adjacent pixels 66 across the line result in a line of varying intensity which through exposure alters the uniform charge provided on photoreceptor 13 by corotron 16 to a non-uniform or uneven charge pattern which promotes uniform development of any solid areas in the latent electrostatic images subsequently created by the light/lens exposure system.

While the light/lens exposure system of the type employing a fixed platen with movable scanning apparatus has been described, other types of light/lens exposure systems such as moving document, flash, etc. may be envisioned. Further, a dual copying/printing system may be contemplated which in the copying mode employs the light/lens exposure system to copy document originals (with the imaging beam of the printing mode used to alter the charge on the photoreceptor to enhance development of solid areas with uncharged toner as described above) and in the printing mode employs the imaging beam to provide copies in accordance with an image signal input.

While the invention has been described with reference to the structure disclosed, it is not confined to the details set forth, but is intended to cover such modifications or changes as may come within the scope of the following claims.

I claim:
1. In combination:
   (a) means providing a sheet-like beam of high intensity electromagnetic radiation for exposing a photoreceptor in a xerographic system a line at a time,
   (b) means for modulating said beam simultaneously across said line in accordance with an image signal input whereby to provide successive lines of image pixels for exposing said photoreceptor and creating a latent electrostatic image on said photoreceptor, said modulating means including
      (1) an array of individually actuated light valves disposed across and at substantially right angles to the axis of said beam, said array of light valves effectively subdividing said beam into a succession of individual rays, there being at least one light valve for each image pixel comprising said line, and;
      (2) a beam stop;
   said light valves being individually actuatable in accordance with said image signal input so that the light ray associated with each of said light valves is impinged selectively on one of said photoreceptor and beam stop; and
   (c) means to develop said image including
      (1) a source of uncharged toner, and
      (2) means to bring said toner into operative relation with said image;
   simultaneous actuation of plural adjoining ones of said electrodes in accordance with an image signal input representing a solid image area generating plural side by side rays which through destructive interference with one another form a non-uniform image charge pattern representing said solid image area on said photoreceptor and enable said uncharged toner to fully develop said solid image area.

2. In combination:
   (a) a high intensity beam;
   (b) means for transforming said beam into a relatively wide flat exposure beam for exposing a movable photoreceptor a line at a time;
   (c) means for charging said photoreceptor preparatory to exposure;
   (d) means for modulating said beam simultaneously across the width thereof in response to an image signal input whereby to provide a discrete line of pixels for exposing said photoreceptor in accordance with said image signals, said modulating means including
      (1) an optical substrate in the path of said beam; and
      (2) an array of electrodes operatively associated with said substrate, the axis of said electrode array being substantially perpendicular to the axis of said exposure beam, said electrodes being adapted when actuated to diffract the ray of said beam passing through said substrate in the vicinity of said electrodes, the remainder of said beam associated with said unactuated electrodes being undiffracted;
   (e) a central beam stop;
   (f) first optical means for impinging said undiffracted beam against said stop;
   (g) second optical means for impinging said diffracted beam against said photoreceptor to expose said photoreceptor and discharge and photoreceptor to create latent electrostatic images thereon;
   a predetermined image signal input actuating a plurality of adjoining ones of said electrodes in unison so that destructive interference is produced between each adjoining ray so that the area of said photoreceptor against which the diffracted rays output by said adjoining ones of said electrodes is nonuniformly exposed to produce a nonuniformly charged image area;
   (h) a supply of uncharged polarizable toner; and
   (i) means for bringing said toner into developing relationship with said photoreceptor and said non-uniformly charged image area whereby said toner develops said non-uniformly charged image area uniformly.

3. A process for enhancing developing of solid image areas in a xerographic system having a movable photoreceptor, and means to uniformly charge the photoreceptor in preparation for imaging, the steps which comprise:
   (a) generating a sheet-like beam of high intensity light for exposing said photoreceptor a line at a time;
   (b) dividing said beam into a series of individually actuatable image rays, said image rays when actuated exposing said photoreceptor;
   (c) producing a solid image area in accordance with an image signal input by actuating a predetermined block of neighboring image rays;
   (d) creating nulls between individual ones of said neighboring image rays in said predetermined block to provide variable exposure with resultant variable charge pattern for said solid image area, and
   (e) bringing said photoreceptor with said variable charge pattern into developing relationship with an uncharged polarizable toner whereby to provide enhanced development of said solid image area through the use of said uncharged polarizable toner.

4. In combination:
   (a) a high intensity beam;

(b) means for transforming said beam into a relatively wide flat exposure beam for exposing a photoreceptor in a xerographic system a line at a time between said charging means and said exposure means;

(c) an optical substrate in the path of said beam;

(d) an array of electrodes operatively associated with said substrate for selectively diffracting the ray-like portions of said beam in the vicinity of each electrode whereby said beam is separated into a succession of individual rays forming said exposure beam;

(e) optical means for impinging said exposure beam against said photoreceptor to expose said photoreceptor;

(f) a supply of uncharged polarizable toner; and (g) means for bringing said toner into developing relationship with said photoreceptor, (h) actuating plural side by side ones of said electrodes in unison in response to an image signal producing a series of side by side rays that interfere with one another and generate a non-uniform charge on said photoreceptor for development by said toner.

* * * * *